April 6, 1926. 1,580,006

R. W. BROWN

MACHINE FOR CUTTING COMPOUND CURVES

Filed Dec. 29, 1922 7 Sheets-Sheet 1

Inventor:
Ray W. Brown
By Hazard & Miller
Attorneys.

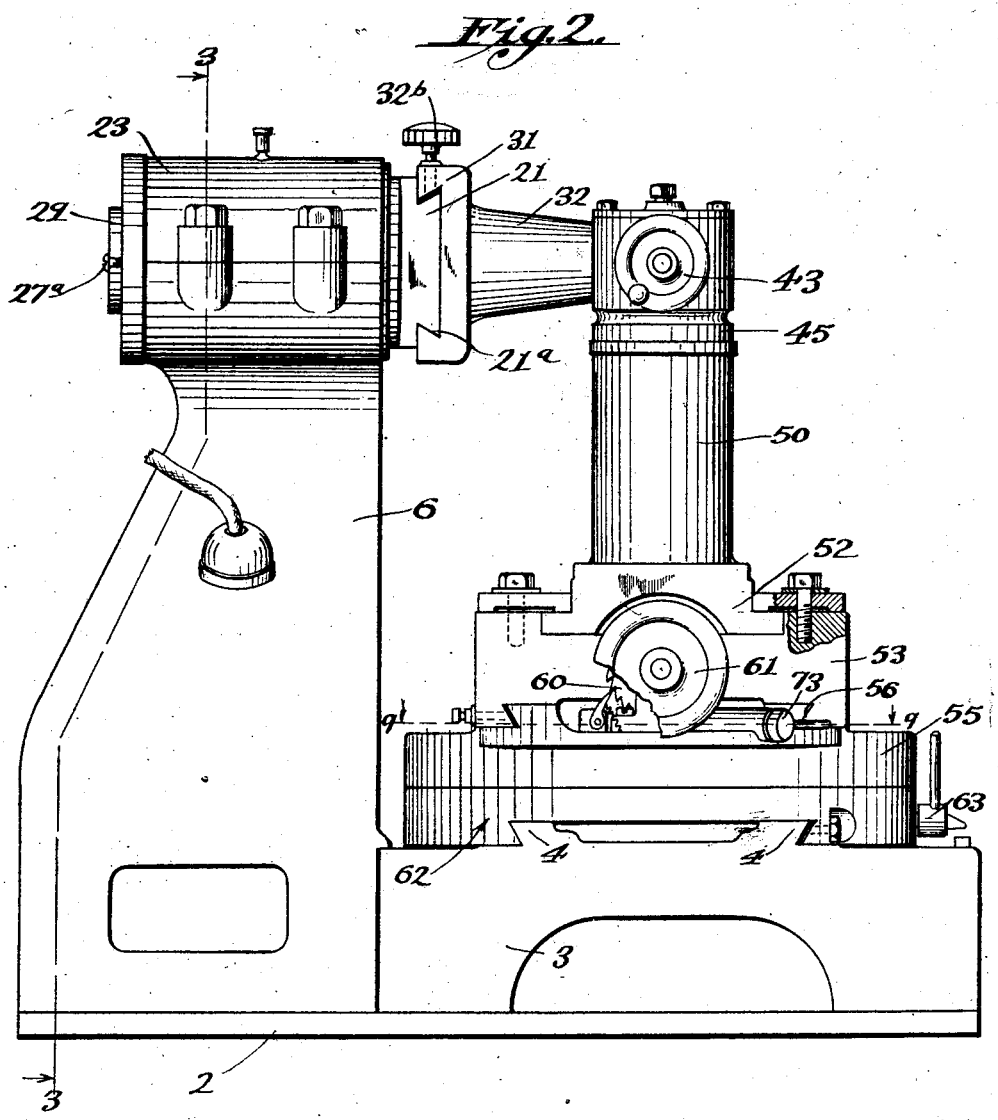

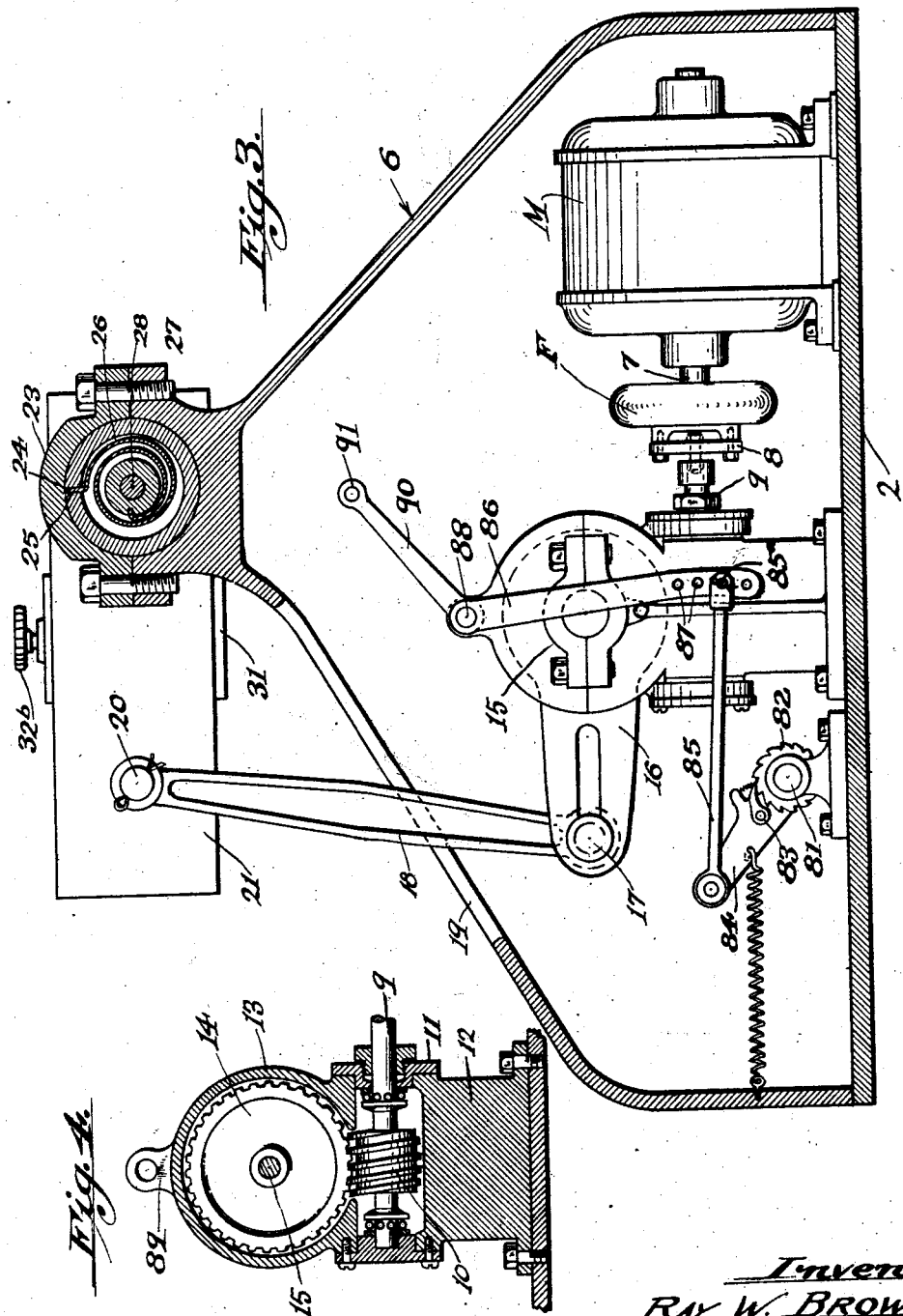

April 6, 1926.
R. W. BROWN
1,580,006
MACHINE FOR CUTTING COMPOUND CURVES
Filed Dec. 29, 1922 7 Sheets-Sheet 4
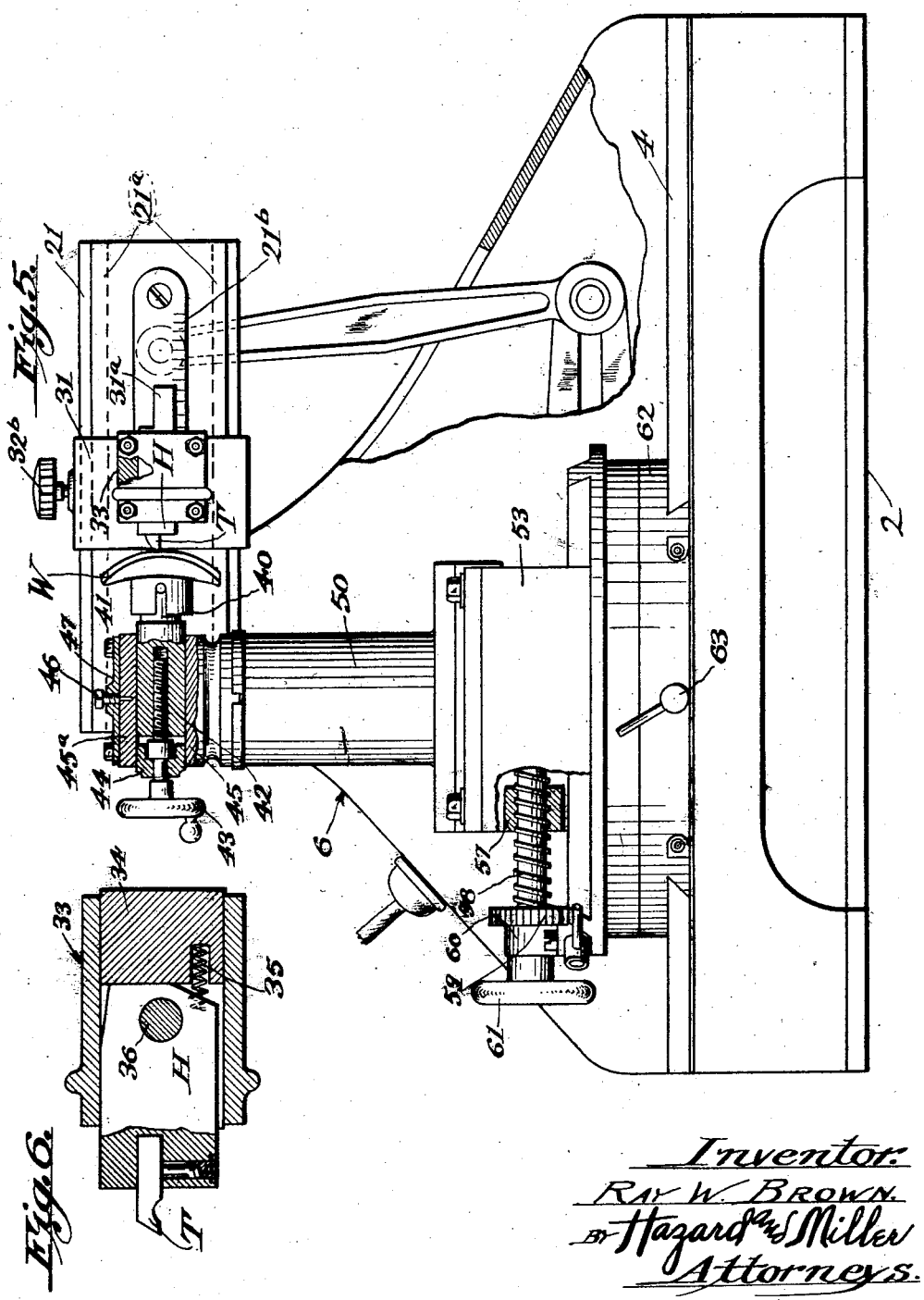
Inventor:
Ray W. Brown.
By Hazard and Miller
Attorneys.

April 6, 1926. 1,580,006
R. W. BROWN
MACHINE FOR CUTTING COMPOUND CURVES
Filed Dec. 29, 1922    7 Sheets-Sheet 6

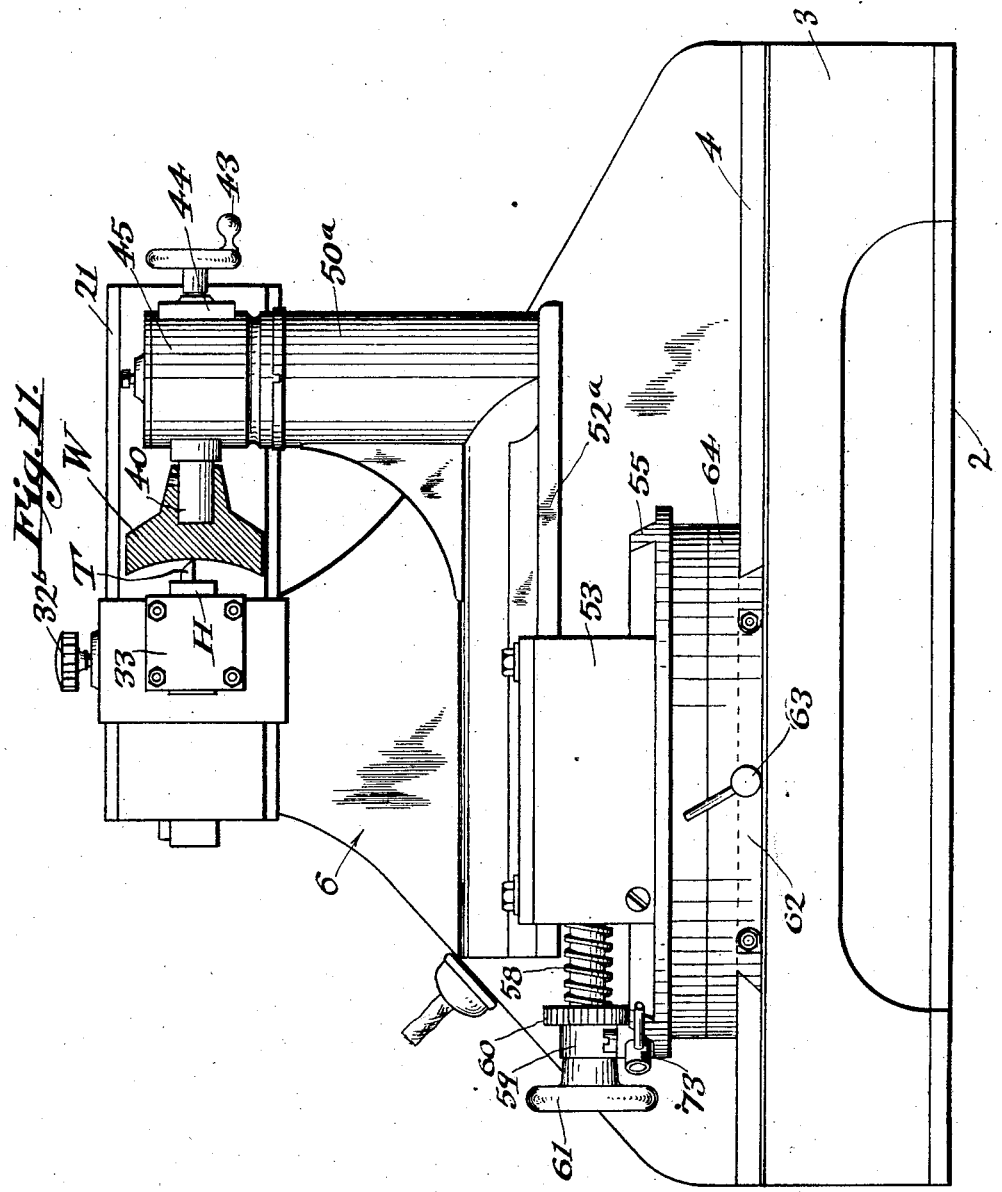

Patented Apr. 6, 1926.

1,580,006

UNITED STATES PATENT OFFICE.

RAY W. BROWN, OF LOS ANGELES, CALIFORNIA, ASSIGNOR, BY MESNE ASSIGNMENTS, TO BARNEY OLDFIELD MANUFACTURING COMPANY, A CORPORATION OF CALIFORNIA.

MACHINE FOR CUTTING COMPOUND CURVES.

Application filed December 29, 1922. Serial No. 609,717.

*To all whom it may concern:*

Be it known that I, RAY W. BROWN, a citizen of the United States, residing at Los Angeles, in the county of Los Angeles and State of California, have invented new and useful Improvements in Machines for Cutting Compound Curves, of which the following is a specification.

This invention relates to the art of forming curved surfaces.

An object of the present invention is to provide an improved machine having a specially great range of capacity for forming curved surfaces and more particularly for forming spherical surfaces, compound curved surfaces having curvatures consisting of true arcs and for forming surfaces of irregular curves. Another object of the invention is to provide a machine of simple, substantial and practical construction to facilitate the ready and accurate forming of curved surfaces by simple adjustment of cooperative elements of the machine up to their maximum range of adjustment, and to provide for the attachment and resetting and reorganization of the principal elements of the machine so as to utilize templates for use in operations beyond the limit of range of adjustment of coordinate elements of the machine.

It is to be understood that while the machine lends itself readily to the forming of curved surfaces for laps commonly used in the grinding of eyeglass and other lenses it is not limited to such uses, as various other tools, patterns, dies, and objects may be placed in the machine to be operated upon for the formation of curved surfaces either convex or concave and having true arcuate surfaces or compound or irregular curved surfaces.

Therefore, considering the general utility of the machine of the present invention in the various arts, it is to be understood that the word "work", as hereinafter used, will be understood to refer to the object placed in the machine to be operated upon thereby and the production of the desired curved surface regardless of the character and use to which the object itself may be intended.

With the above mentioned objects, the invention has various other objects and advantages as will be more fully hereinafter described in the specification with reference to the accompanying drawings, in which—

Fig. 2 is a front end elevation of the machine, an adjusting handle of which is shown as broken away to illustrate a locking pawl in the rear thereof.

Fig. 3 is a vertical longitudinal section on the irregular line 3—3 of Fig. 2 looking in the direction of the arrow.

Fig. 4 is a detail, sectional view showing the worm and gear drive connecting the driving shaft of the machine and a countershaft.

Fig. 5 is a side elevation of the machine with parts broken away to illustrate more clearly certain of the elements and parts in section.

Fig. 6 is a detail, sectional view of the cutting tool box.

Fig. 11 is a side elevation of the machine showing its reorganization by application of means to facilitate concave, curved surface forming.

Figure 7:
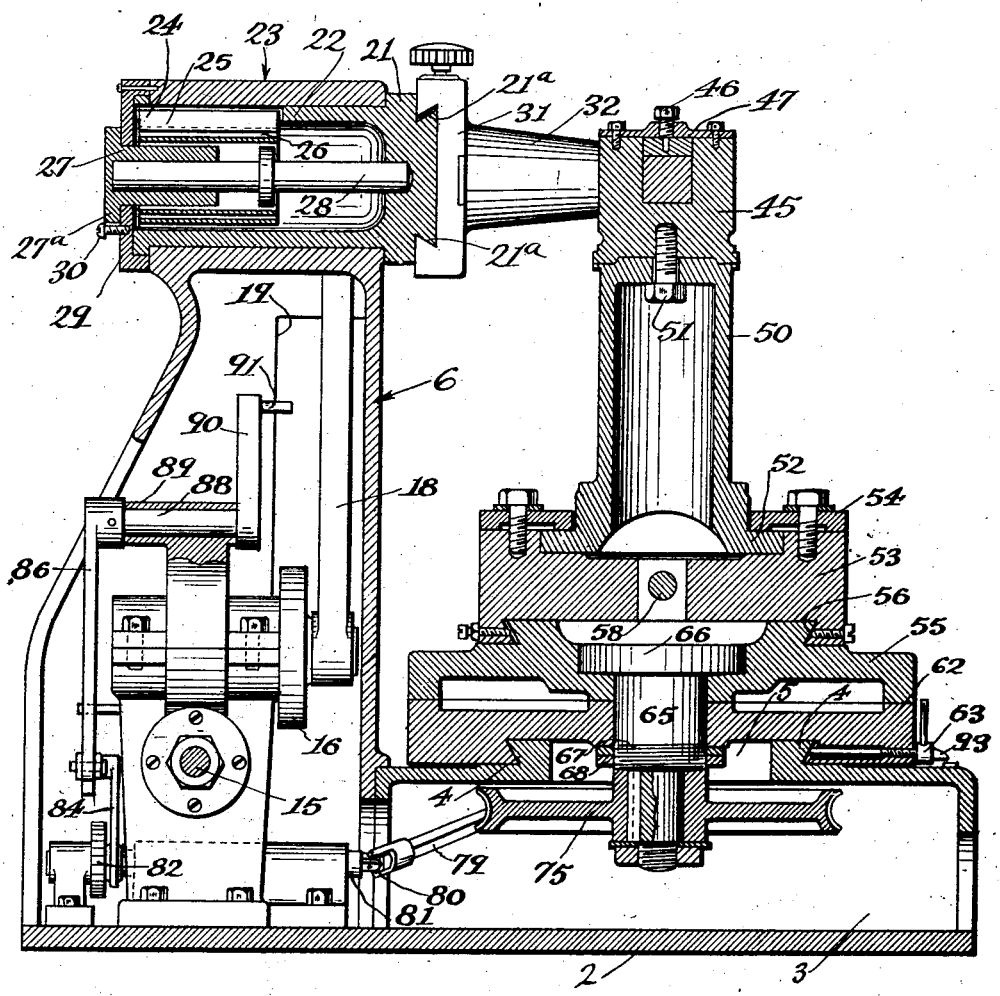
Fig. 7 is a vertical transverse section taken on the irregular line 7—7 of Fig. 1.

The invention, as shown in its present embodiment and organizations, includes a suitable form of frame having a base 2 along one side of which is formed an upstanding platform 3 which has longitudinally extending dovetail or other parallel guideways 4; the platform bed or top being provided with an aperture 5, Fig. 7.

At the opposite side of the bed 2 is provided an upwardly extending and upwardly tapering column 6 which forms a housing within which is arranged a motor consisting preferably of an electric motor M, the shaft of which, for convenience and compactness of construction, extends longitudinally and is provided with a momentum or fly wheel F which serves also as a handwheel for the convenient rotation of the drive shaft 7 which is the shaft of the motor. This drive shaft is preferably flexibly connected, as by a flexible joint 8, to a worm or screw shaft 9 upon which is provided a gear 10 of the worm type; the shaft 9 being journaled in bearings 11 provided in a block 12, the upper portion of which carries a shell 13 enclosing a worm gear 14 which is fixed on a transversely extending shaft 15 and meshes with the screw gear or worm 10.

On the shaft 15 there is secured a crank arm 16 having a crank pin 17 at its swinging end and to which is connected a link 18 extending upwardly through a slot 19 in the top of the housing 6. The upper end of the link 18 is mounted on a fixed pivot pin 20 projecting perpendicularly from a rear face of an arm 21 having a hollow trunnion 22 which is journaled in a box 23 at the head of the housing or column 6, Fig. 7.

The arm 21 extends radially from its trunnion and means are provided for substantially counterbalancing the arm and for eliminating back lash or play and vibration in the operating mechanism just described and which drives the radial arm 21. For such purpose the hollow trunnion 22 is longitudinally slotted at 24 to receive an outturned end 25 of a spiral spring 26 of suitable strength and which has its inner end attached to a core 27 which is loosely mounted on an axial pin 28 fixed in the hollow trunnion 25. To tension the spring 26 so as to exert a counterbalancing effect on the radial arm 21, the core 27 is adapted to be rotated to the desired degree and then locked. For this purpose the core 27 is provided with a notched flange 27ª overlapping a cap 29 fixedly connected to the end of the box 23 in which the hollow trunnion 22 is mounted. When the winding core 27 has been turned to the desired extent it is locked as by a lock screw 30 to the stationary cap 29. It will be seen, therefore, that the spring 26 serves to substantially counterbalance the radial arm 21 and also to take up back lash or play in the operating connections between the arm and the worm 10.

The outer face of the radial arm 21 is provided with suitable guides 21ª extending longitudnally and upon these guides there is longitudinally slidable the base 31 of a tool bearing arm 32. The outer end of the tool arm 32 is provided with a tool box 33, a chamber of which extends at right angles to the length of the arm 32, or in other words parallel to the length of the radial arm 21 along which the base 31 of the tool arm is adjustable so as to position a cutting tool T at any desired point with respect to the axis of oscillation of the radial arm.

The tool box is provided with a closure 34 at one end in which there is arranged an expansion spring 35 engaging the contiguous corner of a tool holder H which is shown as pivotally mounted on a transverse pivot pin 36 in the box 31. This construction provides for the downward yielding movement of the cutting tool T as its box 33 is moved upwardly with and by the oscillating radial arm 21 as the tool T moves over a piece of work W which, in the present case, is shown as mounted upon a work holding element represented here as a plug 40 having a cylindrical portion internally threaded at 41 to receive an adjusting screw 42, the front end of which is provided with a manipulating handwheel 43. The screw 42 is retained by a collar 44 against axial movement, this collar being fixed in a head 45 chambered transversely to receive the body of the plug 40. The plug body is here shown as being of rectilinear cross section, and upon its top there is positioned a clamp plate 45ª forced downwardly by a clamp screw 46 provided in a removable top plate 47 on the head 45. It will be seen, therefore, that any necessary fine adjustment of the work W toward and from the tool T can be readily had by turning the work screw 42 to advance or retract the work.

In operation it will be seen that while the work W is held in the work holding device, an arcuate cut of true circular form will be made upon the face of the work while the cutter is moving on the downward stroke of the radial arm 21.

The length of the radius of the curve cut being made by the tool T is determined according to the distance radially of the cutting edge of the tool from the projected axis of oscillation of the tool driving arm 21, and to facilitate the accurate adjustment for radius of cut, the arm is shown as provided with an embedded or otherwise formed scale 21ª with which there is adapted to be registered an index finger 31ª carried by the base 31 of the tool arm 32. The arm 32 is adapted to be locked at the desired position as by a clamp screw 32ᵇ.

The work holder or head 45 is in the form of a cylindrical section and has its lower end face provided with substantial radial ribs 45ª, and these are designed to mesh with complementary registering keyways in the top of a work post 50 through which projects a clamp screw 51 entering the bottom of work head 45. The work post 50 is provided with a base 52 which is slidable in ways provided in the top of a slide 53 provided with clamp strips 54 engaging the base 52 of the post 50. The slide is adapted for longitudinal adjustment across the top of a turret 55 provided with guides 56 on its top to receive complementary guides formed on the bottom of the slide 53. The slide 53 is provided with a threaded boss 57 through which extends a feed screw 58 turnable in a bearing 59 without longitudinal movement and having a ratchet wheel 60 and a handwheel 61.

The turret is rotatably supported on the top of a carriage 62 adapted for adjustment longitudinally along the guideways 4 on the top of the platform 3. The carriage 62 is adapted to be locked at any desired position along the guideways 4 as by means of a clamp screw 63 extending inwardly from the outer side of the carriage and adapted to engage a contiguous guideway or rail 4, as clearly shown in Fig. 7.

Extending vertically through the aperture 5 in the top of the platform 3 is a substantial stud 65 having a head 66 countersunk in the top of the turret 55; the turret being adapted for free rotation about the stud 65, which latter is provided with a threaded portion 67 to receive lock nuts 68 adjustable so as to retain the stud 65 against undue vertical play or movement in the turret 55 and in the aperture provided in the carriage 62. The stud 65 is adapted to be intermittently rotated during the action of the machine for the purpose of swinging the work W in an arc, the radius of which springs from the center of rotation of the turret 55 as determined by its adjustment with the carriage 62 along the platform of the bed.

Figure 9:
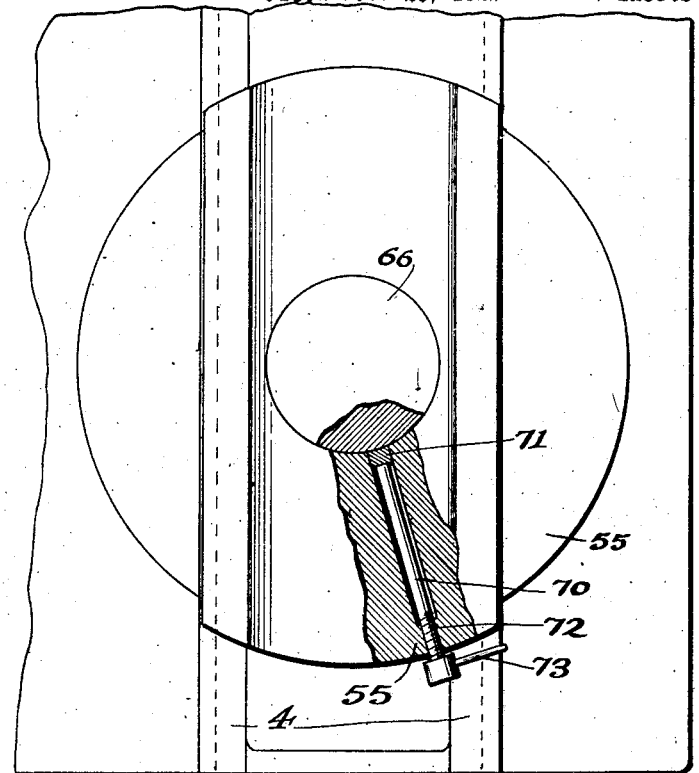
Fig. 9 is a plan of the turret and illustrating parts thereof in sectional detail to show the turret lock.

For the purpose of driving the turret 55 by the normally free stud 65, I provide a clamp device shown as including a clamp rod 70, Fig. 9, the inner end of which engages a clamp shoe 71 which is adapted to be forced against the head 66 of the driving stud 65; the outer end of the clamp rod 70 being threaded at 72 in a contiguous part of the turret 55 and being provided with a simple hand lever 73.

Figure 8:
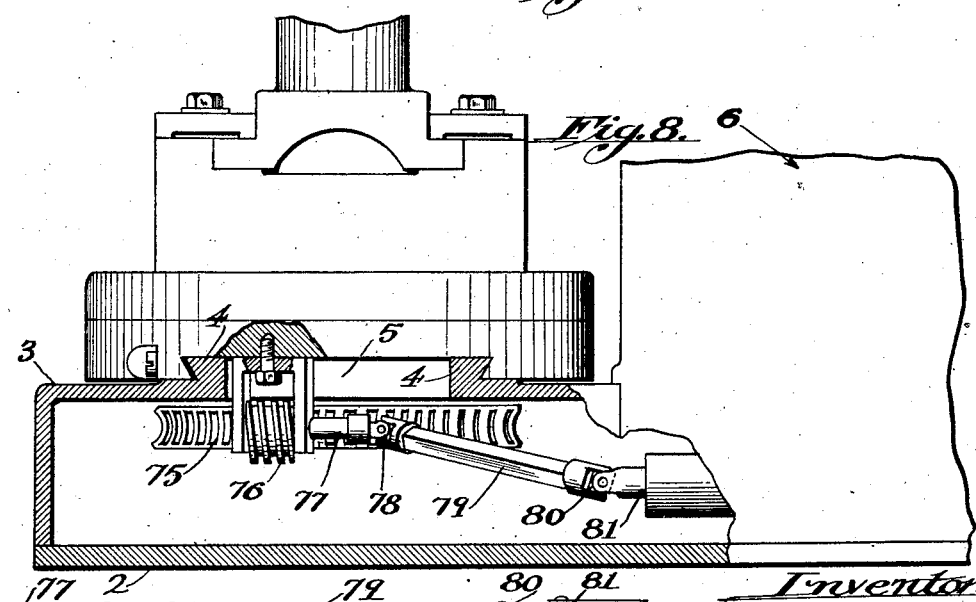
Fig. 8 is an end elevation of a portion of the machine and partial section vertically on the plane indicated by line 8—8 of Fig. 1.
Figure 10:
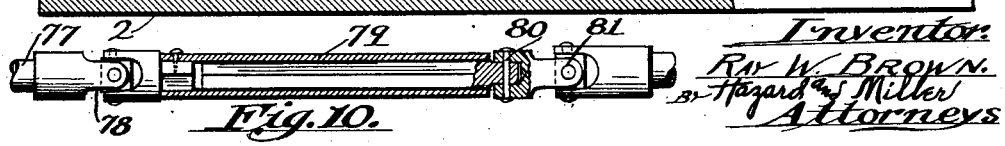
Fig. 10 is a detail, sectional view of a universal connecting shaft for operating the turret stud.

It is desirable to provide for the automatic and intermittent rotation of the turret and its driving stud during the operation of cutting or working upon a piece of work, and for this purpose the stud 65 has keyed on its lower end a worm wheel 75 meshing with a screw gear or worm 76, Fig. 8, formed on or provided on a shaft 77 to which is connected a universal joint 78 from which extends a telescopic shaft 79 having a universal joint connection 80 with a transversely extending shaft 81, Fig. 3. Upon this shaft there is secured a ratchet wheel 82 engageable to be driven in one direction by a yielding pawl 83 which is connected to a lever arm 84 loosely mounted on the shaft 81. The lever 84 is connected by a link 85 to the lower end of a lever arm 86 having a series of perforations 87 in one or another of which the connecting pin 85a of the link 85 may be adjusted in assembling the parts. It is desirable to provide a feed stroke to the lever arm 84, for instance for each complete cycle of the tool driving radial arm 21 so that at the completion of a cutting stroke as by the tool T on the work W, the work will be given a slight movement in a horizontal arc by the rotation of the turret 55. One means of securing this step by step action of the work in a plane at right angles to the plane of oscillation of the tool includes the lever arm 86 shown as being secured on a transverse rock shaft 88 provided in a bearing 89 on the top of the gear case 13. Secured on the inner end of the rock shaft 88 is a lever arm or crank device 90 having a pin 91 projecting into the path of rotation and the path of oscillation of the main crank 16.

Therefore, during the operation of the main crank and the link 18 the crank pin 91 of the rock shaft 88 will be encountered by the crank arm 16 and the crank arm 90 will be oscillated thus oscillating the lever arm 86 and in turn the lever arm 84 with the feed shaft 81 from which motion is transmitted by the telescopic universally connected shaft 79 and to the worm 76 whereby the turret driving gear 75 will be rotated in a step by step motion and the work turned in step by step action on an arc in a horizontal plane.

The telescopic shaft 79, it will be seen provides for the adjustment of the carriage 62 along the platform of the bed and serves to drive the turret driving gear 75 irrespective of its adjustment along the platform.

From the above it will be seen that the machinery in the organization, as above described, enables the ready forming of compound curved surfaces upon the work with the planes of the curvatures being at right angles to each other. The radius of the curve in one direction on the surface being operated upon by the cutter is nicely determined by the adjustment of the cutter toward or from its center of oscillation, while the curvature of the surface at right angles to the cutter arc is accurately, readily and efficiently produced by the adjustment of the carriage along the bed with respect to the vertical plane passing along the axis of oscillation of the cutter.

Figure 1:
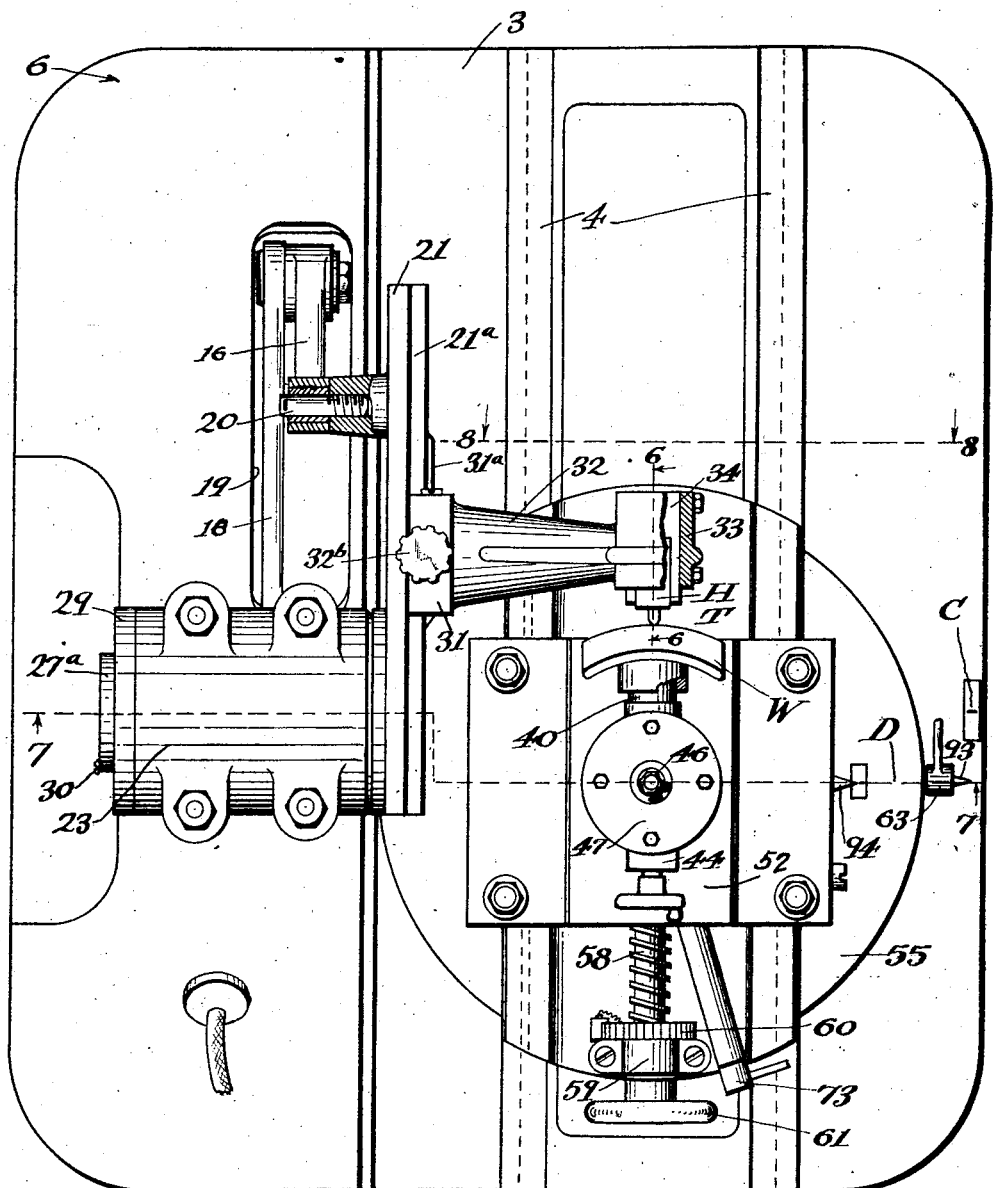
Figure 1 is a plan of an embodiment of the machine showing it as adapted for cutting a compound-curve, convex surface on a piece of work.

To facilitate this adjustment of the carriage, the platform or bed may be provided with a center mark C, Fig. 1, and the carriage is provided with an index finger or pointer 93 adapted to be moved into register with the center mark C. The top of the carriage is also provided with a center mark D with which there is adapted to be registered a centering pointer or finger 94 projecting from the slide 53 so that the slide can be registered on the center of the turntable and the turntable registered on the center line mark C thus bringing the vertical axis of the turntable and the work holder into the vertical plane of the horizontal axis of oscillation of the cutter. It will be seen that if the cutter is set for a given radius of cut, say three inches, and if the tool holder be set on the center of oscillation of the tool and the face of the work to be operated upon to be set three inches from the center of the work holder, then when the machine is in operation a spherical surface can be produced, since the work will swing in an arc having a radius of three inches as to the center of the work holder and the tool will be oscillating in a radius of three inches as to its own center and, therefore, if the work is shifted step by step concurrently with the oscillations of the cutter the surface of the work will be made spherical.

It will be seen that by reason of the arrangement of the axis of the worm wheel shaft 15 to one side of the vertical plane of the axis of the trunnion 22 of the oscillating arm 21 that this arm will be given a slow operative cutting stroke and a quick idle return stroke of the arm and tool.

For the cutting of surfaces having compound curves with arcs at right angles to each other, it is only necessary to adjust the tool T with its holder to the proper setting along the cutter operating arm 21 and then to set the work holder post 50 with the work on the center mark D on the turret with the face of the work at a distance from the axis of the tool post equal to the length of the radius of the tool stroke. Then for the difference in curvature as to the arcs forming the compound curved surface, the carriage 62 is offset from the center mark C a distance equal to the difference between the radius of the tool stroke and the distance between the center of the tool post and the face of the work thereon, as is clearly shown in Fig. 1. It will be seen that when the machine is in operation for cutting compound curves, the cutter will oscillate on a horizontal axis in an arc concentric to the axis of rotation of the tool driving arm 21 and the work W will swing in a horizontal plane in an arc the radius of which is the distance from the center of the turret to the point of the tool in its working position.

When it is desired to cut concave surfaces, a form of tool post including a column 50ª, Fig. 11, having an extension base 52ª is adapted to be mounted in the slide 53 on the turret 55 so that the work W can be disposed outwardly as to a tool H in the tool holder 33 which is adapted to be adjusted along the oscillating arm 21 between the center of oscillation and the surface of the work to be operated upon. This, therefore, will result in the movement of the tool H in a vertical plane scribing an arc making a concave cut in the face of the work. The compound curvature of the surface may be secured by the adjustment of the turret 55 and its carriage 62 along the platform guides 4 to the desired degree with the result that the work will move in a horizontal plane and describe an arc determined according to the setting of the face of the work as to the center of rotation of the turret.

What is claimed:

1. In a machine for forming compound curved surfaces, an oscillating tool holder, a work holder, a turret for swinging the work holder in an arc in a plane at a right angle to the plane of the path of movement of the tool holder, and means for shifting the turret and the work holder along a path at right angles to the axis of oscillation of the tool holder.

2. A machine for forming curved surfaces having curves in planes at right angles to each other, including an arm carrying a tool holder, a driving shaft, means connecting the shaft to the arm for oscillating it, and a means acting constantly to take up lost play or back lash of parts between the shaft and the arm.

3. A machine for forming curved surfaces having curves in planes at right angles to each other, including an arm carrying a tool holder, a driving shaft, means for connecting the shaft and the arm to oscillate the latter, and means acting constantly to take up lost play between the shaft and the arm; said means including a tensioned spring having one end connected to the arm.

4. A machine for forming curved surfaces having curves in planes at right angles to each other, including an arm carrying a tool holder, a driving shaft, means for connecting the shaft and the arm to oscillate the latter, means acting constantly to take up lost play between the arm and the shaft and comprising a tensioned spring, and means for readily varying the tension of the spring.

5. A machine for forming curved surfaces having curves in planes at right angles to each other, including an arm carrying a tool holder, a driving shaft, means for connecting the shaft and the arm to oscillate the latter; said arm having a hollow trunnion, and a take-up spring housed in the trunnion and re-actively attached to the arm.

6. A machine for forming surfaces having curves generated in different planes, including a frame having a bed with guideways, means movable along said guideways and carrying a work holder, a column disposed at one side of the guideways, an arm having a trunnion disposed at a right angle to the guideways and journalled in the column; the arm lying along the guideways, a holder projecting laterally from the arm, and means for oscillating the arm and the holder thereon.

7. A machine for forming surfaces having curves generated in different planes, including a frame having a bed with guideways, means movable along said guideways and carrying a work holder, a column disposed at one side of the guideways, an arm having a trunnion disposed at a right angle to the guideways and journalled in the column; the arm lying along the guideways, a holder projecting laterally from the arm, and means for oscillating the arm and the holder thereon; said oscillating means being housed in the said column.

8. A machine for forming surfaces having curves generated in different planes, including a frame having a bed, a carriage adjustable along the bed, means for holding it adjusted, a turret turnable on its axis on the carriage, a work holder adjustable across the turret, and means for intermittently stepping the turret around.

9. A machine for forming surfaces having curves generated in different planes, including a frame having a bed, a carriage adjustable along the bed, means for holding it adjusted, a turret turnable on its own axis on the carriage, a work holder adjustable across the turret, and means for intermittently stepping the turret around; said means including a rotative head, and a device for co-operatively combining the head with the turret, or releasing it at will.

10. In a machine for forming curved surfaces having curves in planes at right angles to each other, an oscillating arm for moving a tool in an arc on the center of oscillation of the arm, means for setting a tool at various distances from the said center to determine the radius of cut, a work holder for positioning work in the plane of movement of the tool, and means for swinging the work in a plane of the axis of oscillation of the tool, said means including a slidable carriage carrying a turnable turret having a slide on which the work holder is adjustable.

11. In a machine for forming curved surfaces having curves in planes at right angles to each other, an oscillating arm for moving a tool in an arc on the center of oscillation of the arm and having a holding means on one side of the center, a work holder on the opposite side of the center for positioning work in the plane of movement of the tool, and means for swinging the work in a plane of the axis of oscillation of the tool.

12. In a machine for forming curved surfaces having curves in planes at right angles to each other, an oscillating arm for moving a tool in an arc on the center of oscillation of the arm, means for setting a tool at various distances from the said center to determine the radius of cut, a work holder for positioning work in the plane of movement of the tool, and means for swinging the work in a plane of the axis of oscillation of the tool, said means including a turret on which the said holder is adjustably mounted, said turret being adjustable toward and from a plane passing along the said axis.

13. In a machine for forming curved surfaces having curves in planes at right angles to each other, an oscillating arm for moving a tool in an arc on the center of oscillation of the arm, means for setting a tool at various distances from the said center to determine the radius of cut, a work holder for positioning work in the plane of movement of the tool, and means for swinging the work in a plane of the axis of oscillation of the tool, said means including a turret on which the said holder is adjustably mounted, said turret being adjustable toward and from a plane passing along the said axis, said holder being slidably mounted on said turret.

14. In a machine for forming curved surfaces having curves in planes at right angles to each other, an oscillating arm for moving a tool in an arc on the center of oscillation of the arm, means for setting a tool at various distances from the said center to determine the radius of cut, a work holder for positioning work in the plane of movement of the tool, turret means for swinging the work in a plane of the axis of oscillation of the tool, a mechanism for intermittently actuating the turret, and clamp means for connecting and disconnecting the turret to said mechanism.

15. In a machine for forming curved surfaces having curves in planes at right angles to each other, an oscillating arm for moving a tool in an arc on the center of oscillation of the arm, means for setting a tool at various distances from the said center to determine the radius of cut, a work holder for positioning work in the plane of movement of the tool, turret means for swinging the work in a plane of the axis of oscillation of the tool, a mechanism for intermittently actuating the turret, and means for connecting and disconnecting the turret to said mechanism, said mechanism being actuated by means actuating the arm.

16. In a machine for forming curved surfaces having curves in planes at right angles to each other, an oscillating arm for moving a tool in an arc on the center of oscillation of the arm, means for setting a tool at various distances from the said center to determine the radius of cut, a work holder for positioning work in the plane of movement of the tool, turret means for swinging the work in a plane of the axis of oscillation of the tool, a mechanism for intermittently actuating the turret, and means for connecting and disconnecting the turret to said mechanism, said mechanism being actuated in synchronism with said arm.

17. In a machine for forming curved surfaces, a turret carrying a holder, means for sliding the turret bodily, and extensible, flexible shaft means for intermittently swinging the turret step-by-step on its axis irrespective of its change of position along its guide.

18. In a machine for forming curved surfaces, a bed having at one side a column, guideways along the bed in front of the column, a carriage movable along the ways parallel to the column, a trunnion journalled in the head of the column transverse to the carriage movement, an arm extending radially of the trunnion and actuating a holder, a holder mounted for movement transversely to the movement of the first named holder, and means for effecting alternate movements of the holders in planes at right angles to each other.

19. In a machine for forming curved surfaces, a bed having at one side a column, guideways along the bed in front of the column, a carriage movable along the ways, a trunnion journalled in the head of the column, and transversely as to the guideways, an arm extending radially of the trunnion and oscillatively actuating a rotative holder, a holder mounted for movement transversely to the movement of the first named holder, and means for effecting alternate angular movement of the holders in planes at right angles to each other.

In testimony whereof I have signed my name to this specification.

RAY W. BROWN.